(12) United States Patent
Iima

(10) Patent No.: US 8,429,317 B2
(45) Date of Patent: *Apr. 23, 2013

(54) SERIAL COMMUNICATION DEVICE WITH MAC THAT CONFORMS TO SERIAL MEDIA INDEPENDENT INTERFACE (SMII) IN ORDER TO REDUCE POWER CONSUMPTION

(75) Inventor: Tomofumi Iima, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,311

(22) Filed: Apr. 19, 2012

(65) Prior Publication Data

US 2012/0203941 A1    Aug. 9, 2012

Related U.S. Application Data

(63) Continuation of application No. 12/842,300, filed on Jul. 23, 2010, now Pat. No. 8,260,984.

(30) Foreign Application Priority Data

Aug. 11, 2009    (JP) ................................. 2009-186841

(51) Int. Cl.
*G06F 5/00*    (2006.01)
*G06F 1/32*    (2006.01)

(52) U.S. Cl.
USPC ................. 710/61; 710/56; 710/59; 713/320; 713/323

(58) Field of Classification Search .................... 710/56, 710/59, 61; 713/320, 323
See application file for complete search history.

(56) References Cited

U.S. PATENT DOCUMENTS

| | | | |
|---|---|---|---|
| 6,385,208 B1 | 5/2002 | Findlater et al. | |
| 7,227,869 B2 | 6/2007 | Findlater et al. | |
| 8,028,095 B1* | 9/2011 | Lo et al. | 709/246 |
| 8,201,006 B2* | 6/2012 | Bobrek et al. | 713/323 |
| 2010/0262848 A1 | 10/2010 | Bobrek et al. | |

OTHER PUBLICATIONS

"Serial-MII Specification", Revision 2.1 Eng-76080, Feb. 9, 2000, Cisco Systems, http://www.angelfire.com/electronic2/sharads/protocols/MII_protacols/smii.pdf>.
"PE-SMII Serial MII I/F for Inventra's Ethernet MACs Datasheet", Mentor, http://www.mentor.com/products/ip/ethernet/10_100_mbps/upload/pe_smii_pd.pdf>.
"KSZ8041TL/FTL Data Sheet", Rev. 1.1, Apr. 2007, pp. 24-26, Micrel, http://download.siliconexpert.com/pdfs/2008/03/06/semi_ap/manual/mcl/ds/ksz8041t1-ftl.pdf.

* cited by examiner

*Primary Examiner* — Tammara Peyton
(74) *Attorney, Agent, or Firm* — Sughrue Mion, PLLC

(57) ABSTRACT

A serial communication device has: a MAC (Media Access Control), a mask circuit and a buffer. The MAC conforms to Serial Media Independent Interface specification and outputs an identical segment data for plural times within a unit period. The mask circuit is configured to mask a predetermined segment data out of the plurality of identical segment data and to output the other segment data out of the plurality of identical segment data. The buffer is configured to receive the segment data output from the mask circuit and to output the received segment data to a physical layer device in synchronization with a clock signal.

4 Claims, 10 Drawing Sheets

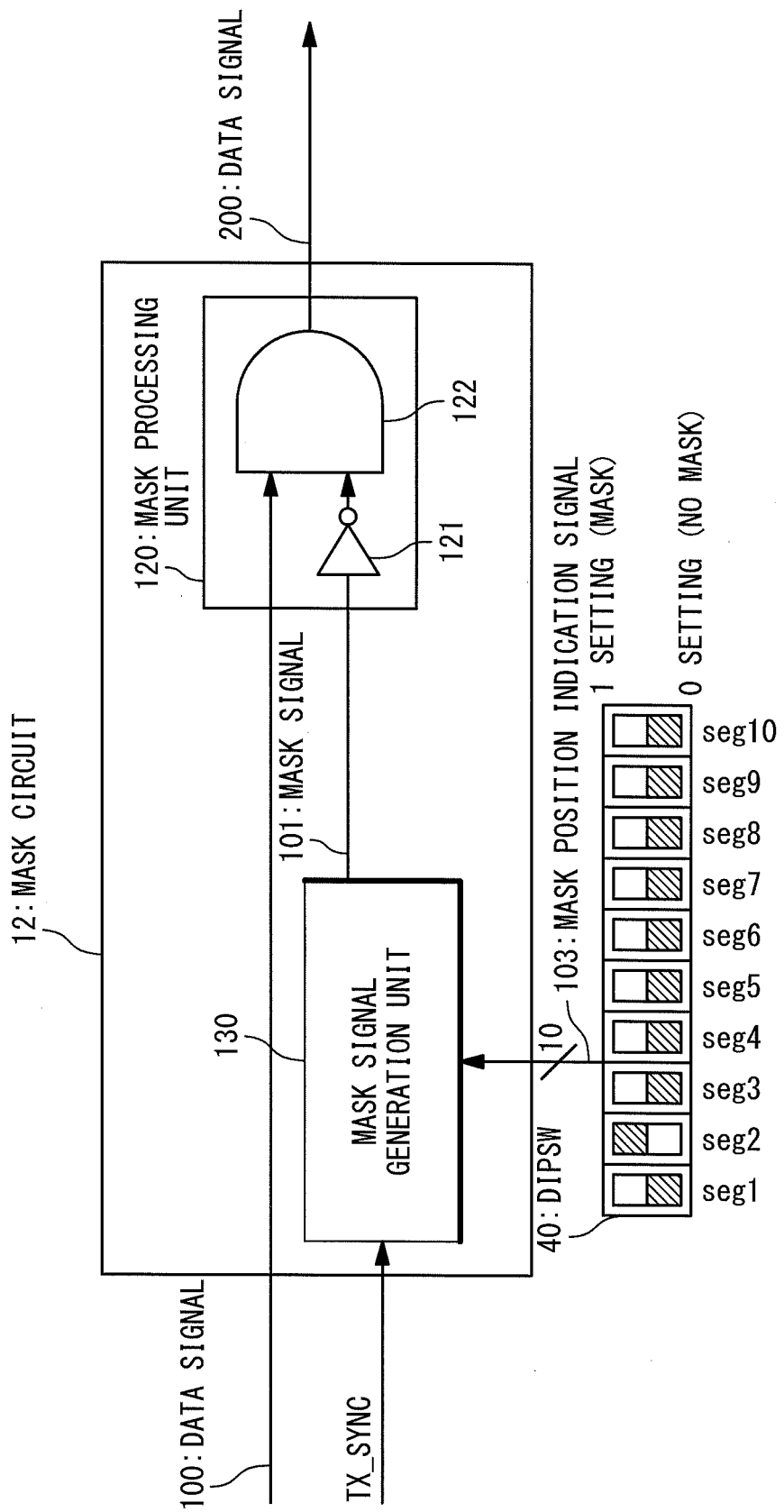

SERIAL COMMUNICATION DEVICE WITH MAC THAT CONFORMS TO SERIAL MEDIA INDEPENDENT INTERFACE (SMII) IN ORDER TO REDUCE POWER CONSUMPTION

INCORPORATION BY REFERENCE

This application is a continuation of application Ser. No. 12/842,300, filed Jul. 23, 2010, which is based upon and claims the benefit of priority from Japanese patent application No. 2009-186841, filed on Aug. 11, 2009, the disclosure of which is incorporated herein in its entirety by reference.

BACKGROUND OF THE INVENTION

1. Field of the Invention

The present invention relates to an interface between a data link layer and a physical layer. In particular, the present invention relates to a serial interface that conforms to SMII (Serial Media Independent Interface).

2. Description of Related Art

In a computer system utilizing the Ethernet (registered trademark), an interface that conforms to such as MII (Media Independent Interface) defined by IEEE 802.3, RMII (Reduced Media Independent Interface) or SMII defined by a vendor is widely used as an interface between MAC (Media Access Control) and PHY (Physical layer device).

The SMII as the MAC/PHY interface specification is used preferably in a processor, an FPGA, an Ethernet (registered trademark) transceiver and the like. In the vendor-defined SMII, signal lines in the MII are serialized in order to reduce the number of signals related to transmission/reception of data and control information. Techniques related to the SMII are described, for example, in U.S. Pat. No. 6,385,208, U.S. Pat. No. 7,227,869, Non-Patent Document 1 ("Serial-MII Specification", Revision 2.1 ENG-46080, Feb. 9, 2000, CISCO SYSTEMS <http://www.angelfire.com/electronic2/sharads/protocols/MII_Protocols/smii.pdf>), Non-Patent Document 2 ("PE-SMII Serial MII I/F for Inventra's Ethernet MACs datasheet", Mentor <http://www.mentor.com/products/ip/ethernet/10_100_mbps/upload/pe_smii_pd.pdf>), and Non-Patent Document 3 ("KSZ8041TL/FTL Data sheet Rev.1.1, April 2007, pp 24-26, Micrel <http://download.siliconexpert.com/pdfs/2008/03/06/se mi_ap/manual/mcl/ds/ksz8041t1-ftl.pdf>).

Among the MII specification, the SMII is the smallest in the number of pins per a port. For example, the number of pins per a port is six (two for data and four for control signals). Moreover, in the case of the SMII, two operation speed modes of 10 Mbps and 100 Mbps are prepared and can be switched. It should be noted that in either mode (10 Mbps, 100 Mbps), the same reference clock of 125 MHz is used for data transfer.

FIG. 1 is a timing chart showing a data transmission operation (10 Mbps) between the MAC and the PHY that conforms to the SMII according to the related technique. Here, as an example, let us explain an operation of transferring data from the MAC to the PHY at a transmission rate of 10 Mbps. A clock signal TX_CLK is generated in synchronization with a reference clock generated on a system board, and is input to the PHY and the MAC. It should be noted that the reference clock may be generated by the MAC. The clock signal TX_CLK is a successive 125 MHz clock and serves as a basis for transmission timing of a transmission data TX.

A synchronization signal TX_SYNC is generated by the MAC based on the reference clock and is input to the PHY. The synchronization signal TX_SYNC indicates a boundary between segments in a transmission data or a reception data. Each segment has a 10-bit width. That is, the synchronization signal TX_SYNC is generated every ten cycles of the clock signal TX_CLK.

The transmission data TX output from the MAC to the PHY within one segment includes byte data TXD0 to TXD7 and transmission control information (error information TX_ER and enable information TX_EN). The data transmitted within one segment is hereinafter referred to as a segment data DATA. In the case of the 10 Mbps mode, an update cycle of the segment data DATA is once per ten segments. Therefore, the MAC outputs an identical segment data DATA to the PHY in synchronization with the synchronization signal TX_SYNC, until the segment data DATA (byte data) is updated. That is, the identical segment data DATA is output repeatedly for ten times from the MAC to the PHY. In the case of the 10 Mbps mode, the PHY can extract the segment data DATA just by sampling any one of the ten segments.

On the other hand, in the case of the 100 Mbps, the segment data DATA is updated for each segment. That is, the segment data DATA is updated in synchronization with the synchronization signal TX_SYNC, and the data sampling in the PHY is performed at a timing in synchronization with the synchronization signal TX_SYNC.

The inventor of the present application has recognized the following points. As described above, the segment data is updated every segment in the case of the 100 Mbps mode, while the segment data is updated once per ten segments in the case of the 10 Mbps mode. Therefore, in the case of the 10 Mbps mode, one segment data among the identical ten segment data just needs to be sampled. However, the segment data other than the sampled one are wasted. In FIG. 1, for example, only the segment data #S1 among ten segment data #S1 to #S10 is sampled in the PHY, and the other segment data #S2 to #S10 become ineffective data. In this case, a period used for transferring the ineffective segment data #S2 to #S10 is nine-times longer than a period required for transferring the effective segment data #S1. During the ineffective period, power is unnecessarily consumed in both of the MAC and the PHY for driving circuits and buffers.

This results from the specification that the PHY as the receiving side just needs to sample either one of the ten segments (refer to the above-mentioned Non-Patent Document 1). To put it the other way around, since the sampling timing in the PHY can be set arbitrarily, the MAC needs to output the identical segment data until the next data update timing.

Moreover, according to the related technique, the frequency of the clock signal TX_CLK is the same 125 MHz in both the 10 Mbps mode and the 100 Mbps mode. In general, power consumption increases in proportion to the driving frequency. In the case of the interface that conforms to the SMII, the driving frequency does not vary even when the transmission rate is changed. Therefore, in the case of the 10 Mbps mode, the clock frequency is relatively high and thus the power consumption for outputting the above-mentioned ineffective data further increases.

SUMMARY

In an embodiment of the present invention, a serial communication device is provided. The serial communication device has a MAC (Media Access Control), a mask circuit and a buffer. The MAC conforms to Serial Media Independent Interface specification and outputs an identical segment data for plural times within a unit period. The mask circuit is configured to mask a predetermined segment data out of the plurality of identical segment data and to output the other segment data out of the plurality of identical segment data. The buffer is configured to receive the segment data output from the mask circuit and to output the received segment data to a physical layer device in synchronization with a clock signal.

In another embodiment of the present invention, a serial communication method is provided. The serial communication method includes: (A) outputting, by a MAC as a media access control that conforms to Serial Media Independent Interface specification, an identical segment data for plural times within a unit period; (B) masking a predetermined segment data out of the plurality of identical segment data while outputting the other segment data out of the plurality of identical segment data; and (C) outputting the other segment data to a physical layer device in synchronization with a clock signal.

During a period when the predetermined segment data is masked, a voltage level of a data signal input to the buffer is fixed at a predetermined voltage level (e.g. Low level). Therefore, power consumption in the buffer and an interconnection connecting between the buffer and the physical layer device can be suppressed during this period.

Thus, according to the present invention, it is possible to reduce power consumption of the interface that conforms to the SMII.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 10 is a block diagram showing another example of a configuration of the mask circuit according to the embodiment of the present invention.

DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Embodiments of a serial communication device according to the present invention will be described below with reference to the attached drawings. In the embodiment described below, the serial communication device is exemplified by an interface circuit 1 that conforms to the SMII specification.

(Configuration)

Figure 1:
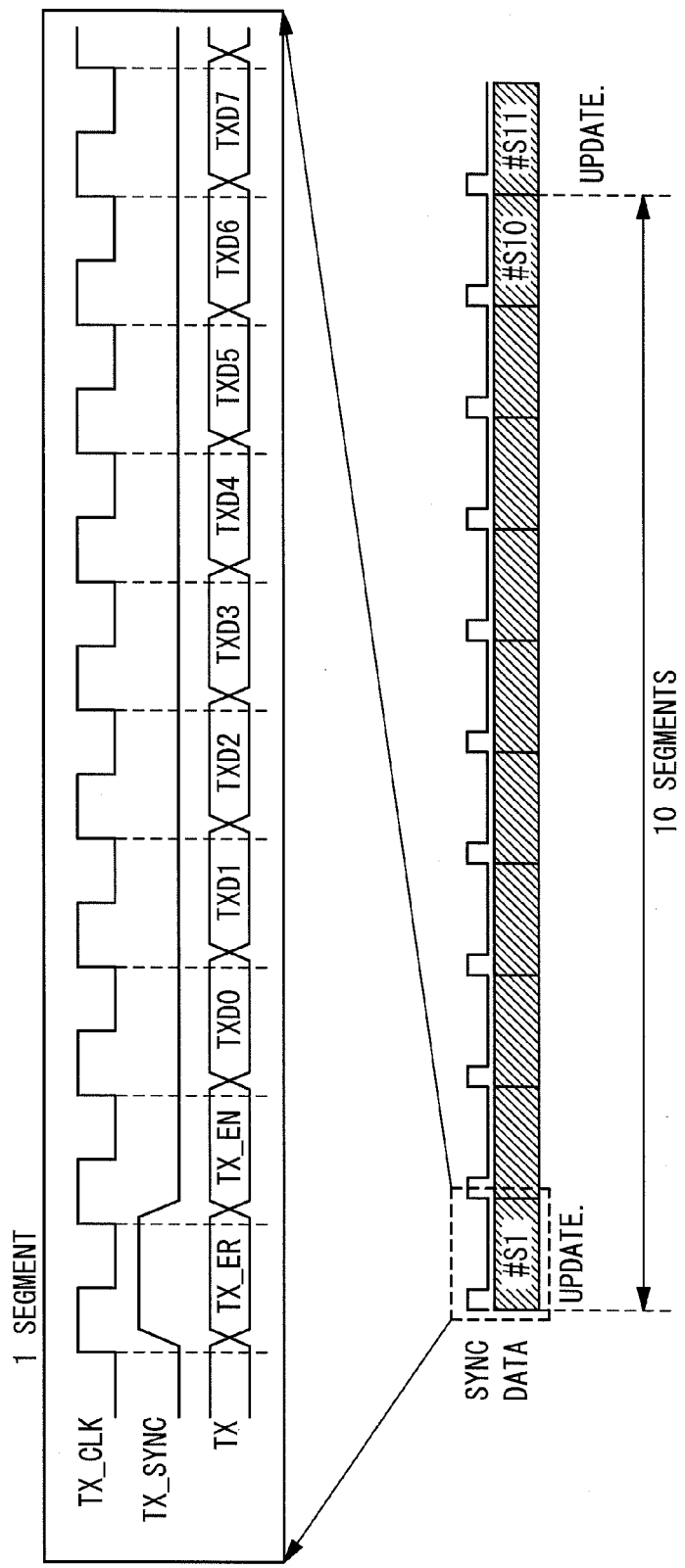
FIG. 1 is a timing chart showing a data transmission operation (10 Mbps) between a MAC and a PHY that conforms to the SMII according to a related technique.
Figure 2:
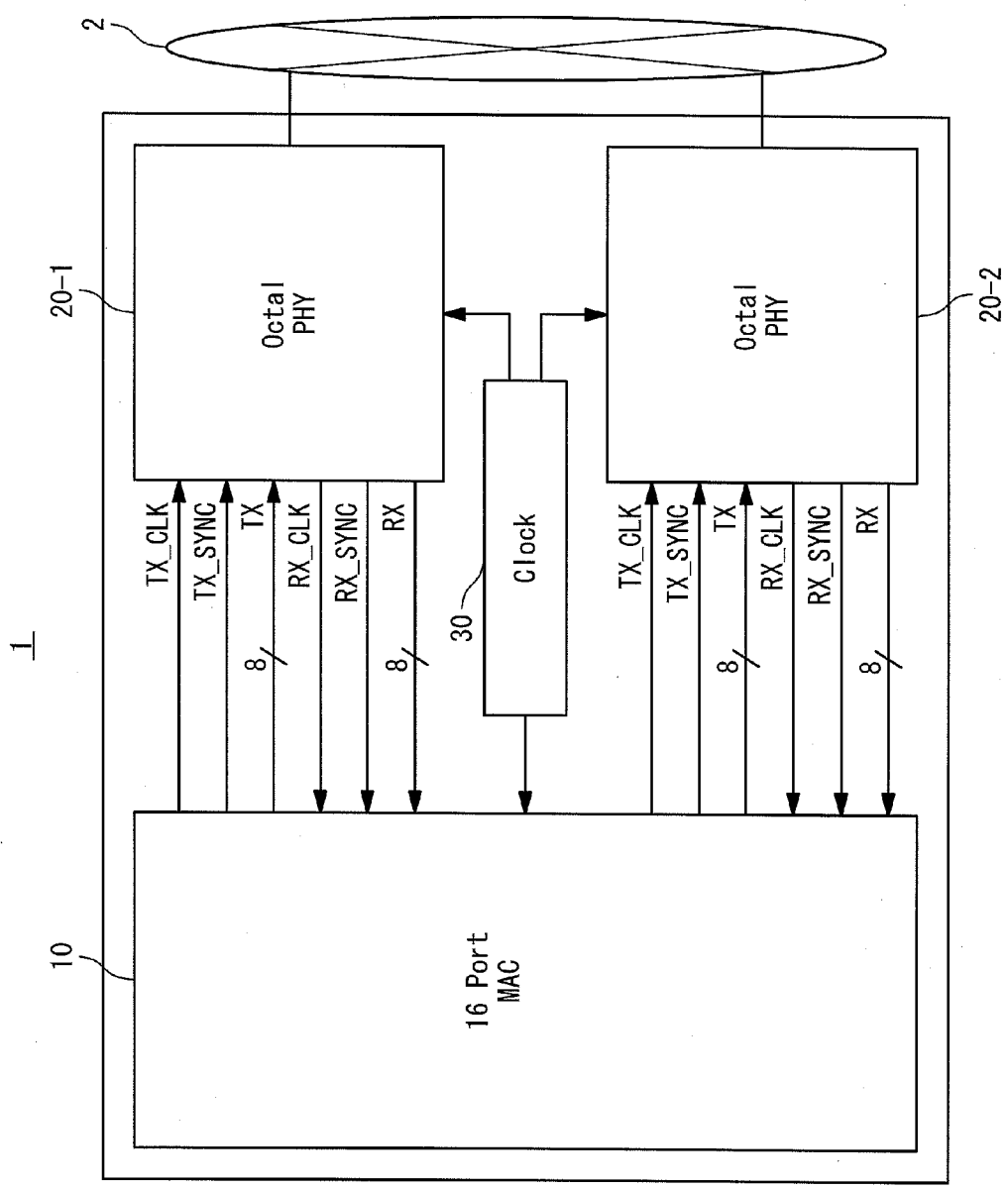
FIG. 2 is a block diagram showing an example of a configuration of an interface circuit according to an embodiment of the present invention.

A configuration according to the present embodiment will be described with reference to FIGS. 2 to 5. FIG. 2 is a block diagram showing an example of a configuration of the interface circuit 1 according to the present embodiment. For example, the interface circuit 1 according to the present embodiment is used in a node (e.g. computer device, rooter) connected to a network 2 such as the Ethernet (registered trademark). The interface circuit 1 has: a chip (hereinafter referred to as a MAC chip 10) provided with a MAC function; a physical layer device (hereinafter referred to as a PHY chip 20) connected to the network 2; and a clock generation circuit 30. In the example shown in FIG. 2, the interface circuit 1 is provided with the MAC chip 10 having 16 ports and the PHY chips 20-1 and 20-2 each having 8 ports. It should be noted that the MAC chip 10 may be further provided with other functional blocks besides the MAC function.

The MAC chip 10 performs a filtering operation based on the MAC protocol. More specifically, the MAC chip 10 adds transmission control information to the transmission data TX and transfers the transmission data TX to the PHY chips 20-1 and 20-2. Moreover, the MAC chip 10 receives reception data RX from the PHY chips 20-1 and 20-2, performs error check of the reception data RX and transfers it to the upper layer.

The MAC chip 10 generates, in synchronization with the synchronization signal TX_SYNC, the segment data to which the transmission control information is added, and transfers the segment data to the PHY chips 20-1 and 20-2 in synchronization with the transmission clock signal TX_CLK. Moreover, the MAC chip 10 receives the reception data RX from the PHY chips 20-1 and 20-2 in synchronization with a reception clock signal RX_CLK. The MAC chip 10 extracts the segment data in synchronization with a synchronization signal RX_SYNC received from the PHY chip 20. Furthermore, the MAC chip 10 has functions of data retransmission, conflict avoidance and so forth.

The PHY chips 20-1 and 20-2 each converts the transmission data TX transferred from the MAC chip 10 into a data signal (e.g. electric signal, optical signal, infrared signal) depending on the network 2 and transmits the data signal to the network 2. More specifically, the PHY chips 20-1 and 20-2 each checks position of the segment data based on the synchronization signal TX_SYNC supplied from the MAC chip 10. In a case of a low-speed mode (10 Mbps mode), the PHY chips 20-1 and 20-2 each extracts the segment data from the data transferred from the MAC chip 10, in synchronization with a certain one cycle among the ten cycles of the synchronization signal TX_SYNC. In a case of a high-speed mode (100 Mbps mode), the PHY chips 20-1 and 20-2 each extracts the segment data from the data transferred from the MAC chip 10, in synchronization with each cycle of the synchronization signal TX_SYNC. The extracted segment data is transferred to the network 2.

Moreover, the PHY chips 20-1 and 20-2 each transfers data received from the network 2 to the MAC chip 10. More specifically, the PHY chips 20-1 and 20-2 each transfers the reception data RX to the MAC chip 10 in synchronization with the reception clock signal RX_CLK and supplies the synchronization signal RX_SYNC indicating reception timing of the segment data to the MAC chip 10.

The MAC chip 10 and the PHY chips 20-1 and 20-2 operates based on a system clock (clock signal CLK) generated by the clock generation circuit 30. The clock signal CLK may be referred to as a reference clock. The transmission clock signal TX_CLK, the reception clock signal RX_CLK, the synchronization signals TX_SYNC and RX_SYNC are clock signals generated based on the clock signal CLK. In the present example, a clock frequency of the clock signal CLK is 125 MHz defined by the SMII specification. Clock frequencies of the transmission clock signal TX_CLK and the reception clock signal RX_CLK are set to the same 125 MHz as of the clock signal CLK. Clock frequencies of the synchronization signals TX_SYNC and RX_SYNC are set to 12.5 MHz which is 1/10 of that of the clock signal CLK.

Figure 3:
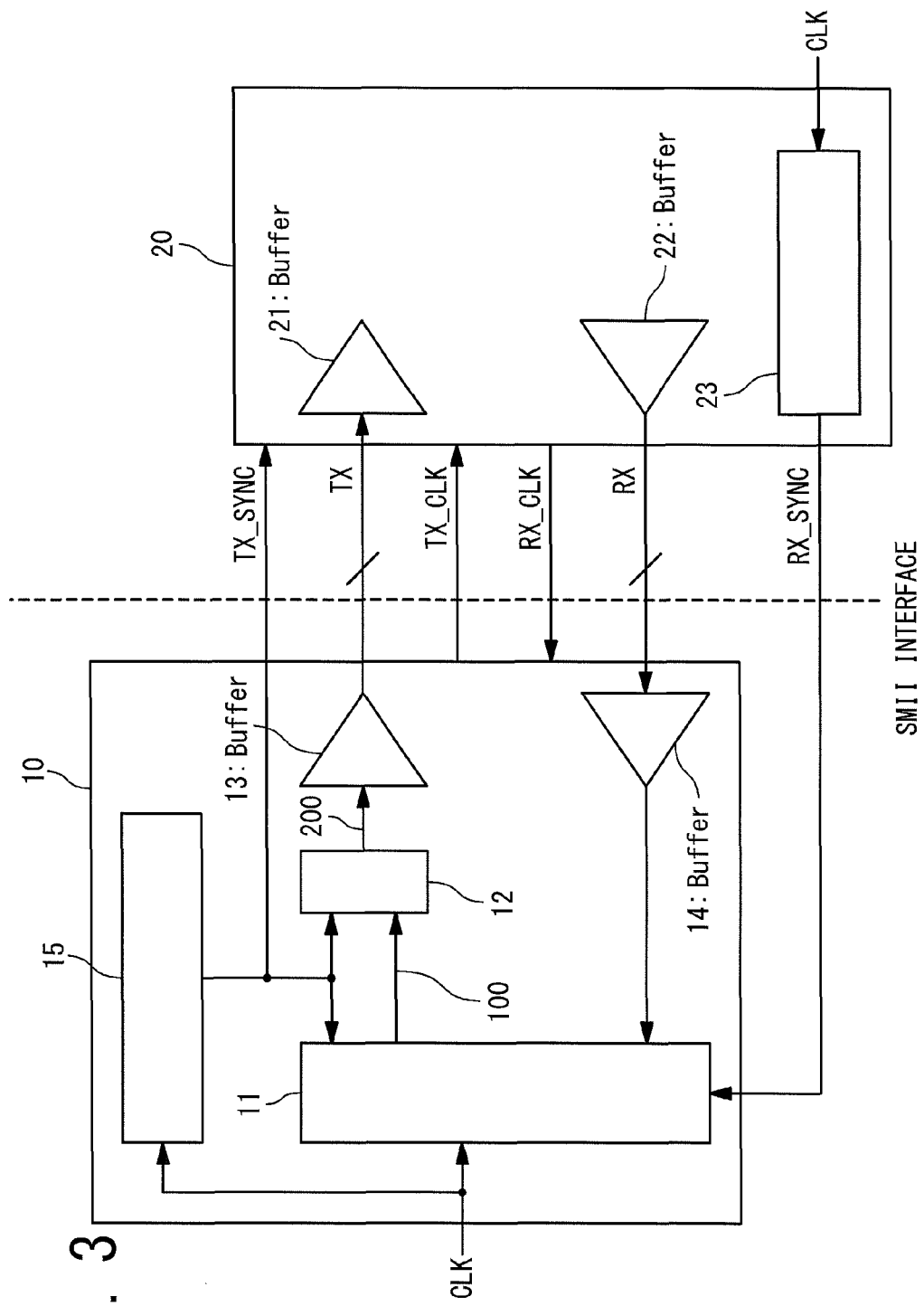
FIG. 3 is a block diagram showing an example of a configuration of a MAC chip and a PHY chip according to the embodiment of the present invention.

FIG. 3 is a block diagram showing an example of a configuration of the MAC chip 10 and the PHY chip 20 according to the present embodiment. The configuration of the MAC chip 10 and the PHY chip 20 will be described with reference to FIG. 3. The MAC chip 10 has a MAC 11, a mask circuit 12, buffers 13 and 14 and a synchronization signal generation device 15.

Figure 5:
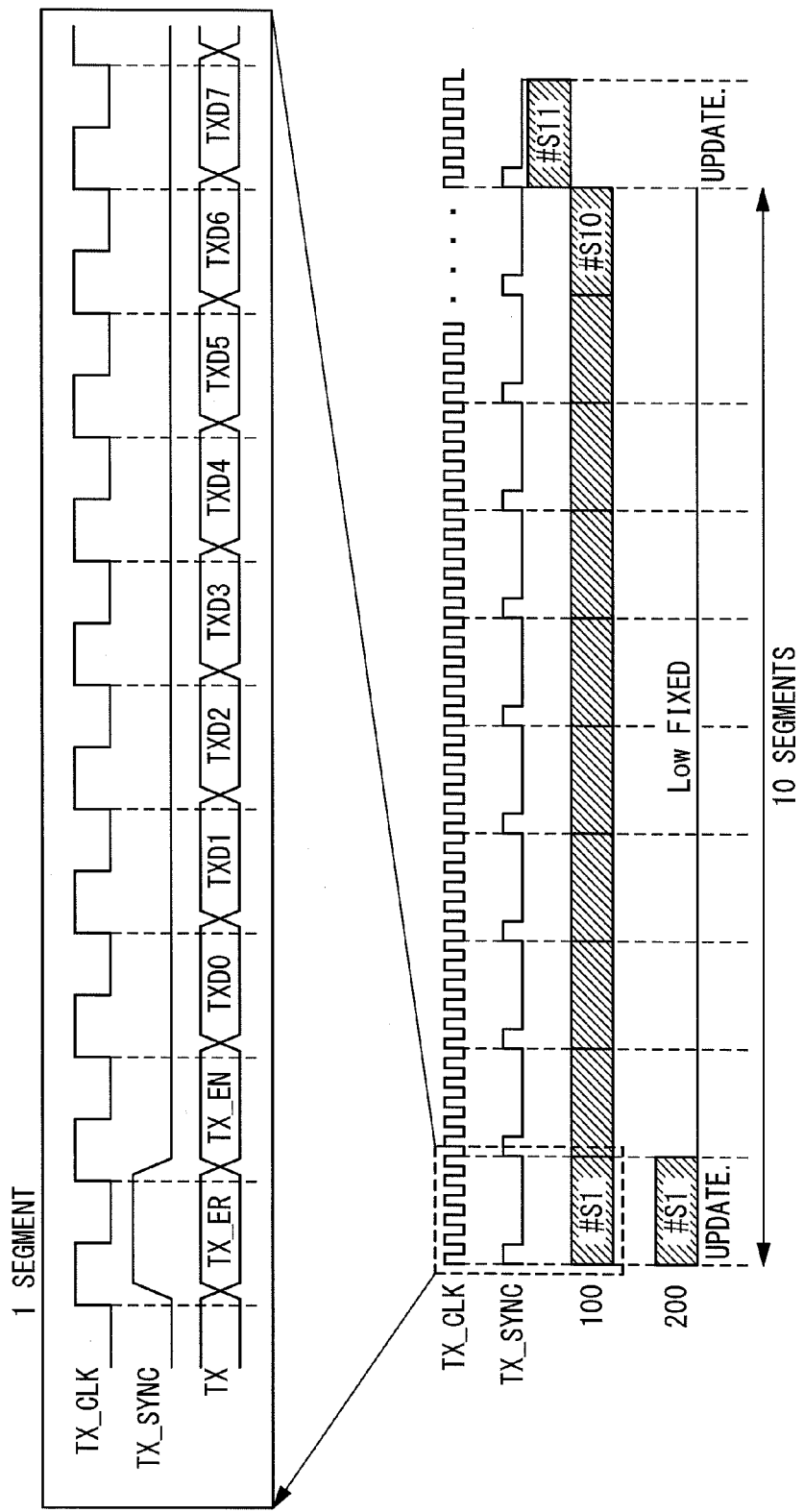
FIG. 5 is a timing chart showing a data transmission operation (10 Mbps) between the MAC and the PHY according to the embodiment of the present invention.

The MAC 11 generates the segment data by adding the transmission control information to data that is input from an upper layer device (not shown) in the data link layer, and outputs the segment data as a data signal 100. An example of the segment data is shown in FIG. 5. As shown in FIG. 5, the MAC 11 outputs the data signal 100 (segment data) in synchronization with the synchronization signal TX_SYNC. That is, the segment data is output every cycle of the synchronization signal TX_SYNC.

The synchronization signal TX_SYNC is generated by the synchronization signal generation device 15. More specifically, the synchronization signal generation device 15 generates the synchronization signal TX_SYNC in synchronization with the clock signal CLK (reference clock). The synchronization signal TX_SYNC indicates a boundary between successive segment data. In the present example, the synchronization signal TX_SYNC having the clock frequency of 12.5 MHz is generated, and ten cycle periods of the clock signal CLK corresponds to one segment. For example, the segment data is a 10-bit data that includes byte data (data TXD0 to TXD7) and additional 2-bit transmission control information (error information TX_ER and enable information TX_EN). The synchronization signal TX_SYNC is supplied to the MAC 11, the mask circuit 12 and the PHY chip 20.

The interface circuit 1 according to the present embodiment has two modes defined by the SMII; the low-speed mode (10 Mbps mode) and the high-speed mode (100 Mbps mode). A major difference between the two modes is that a sampling frequency of the segment data in the PHY chip 20 is different. In the case of the low-speed mode (10 Mbps), the PHY chip 20 samples the segment data every ten cycles of the synchronization signal TX_SYNC. On the other hand, in the case of the high-speed mode (100 Mbps mode), the PHY chip 20 samples the segment data in synchronization with the synchronization signal TX_SYNC. The MAC 11 needs to change (update) content of the segment data on a cycle corresponding to the sampling frequency of the segment data in the PHY chip 20. More specifically, the content of the segment data output from the MAC 11 is updated every ten segments in the case of the low-speed mode (10 Mbps mode) and is updated every segment in the case of the high-speed mode (100 Mbps mode). That is, in the case of the 10 Mbps mode, the MAC 11 repeatedly outputs an identical segment data for ten times in synchronization with the synchronization signal TX_SYNC and thereafter updates the content of the segment data. On the other hand, in the case of the 100 Mbps mode, the MAC 11 updates the content of the segment data in synchronization with the synchronization signal TX_SYNC. It should be noted that, in the case of the low-speed mode, although the update cycle of the segment data and the sampling frequency in the PHY chip 20 correspond to each other, the update timing and the sampling timing are not necessary coincident with each other.

The data signal 100 output from the MAC 11 is input to the buffer 13 through the mask circuit 12. The mask circuit 12 masks a part of the segments in the data signal 100 on a predetermined cycle, and lets the other segment data through to output it as a data signal 200 to the buffer 13.

Figure 4:
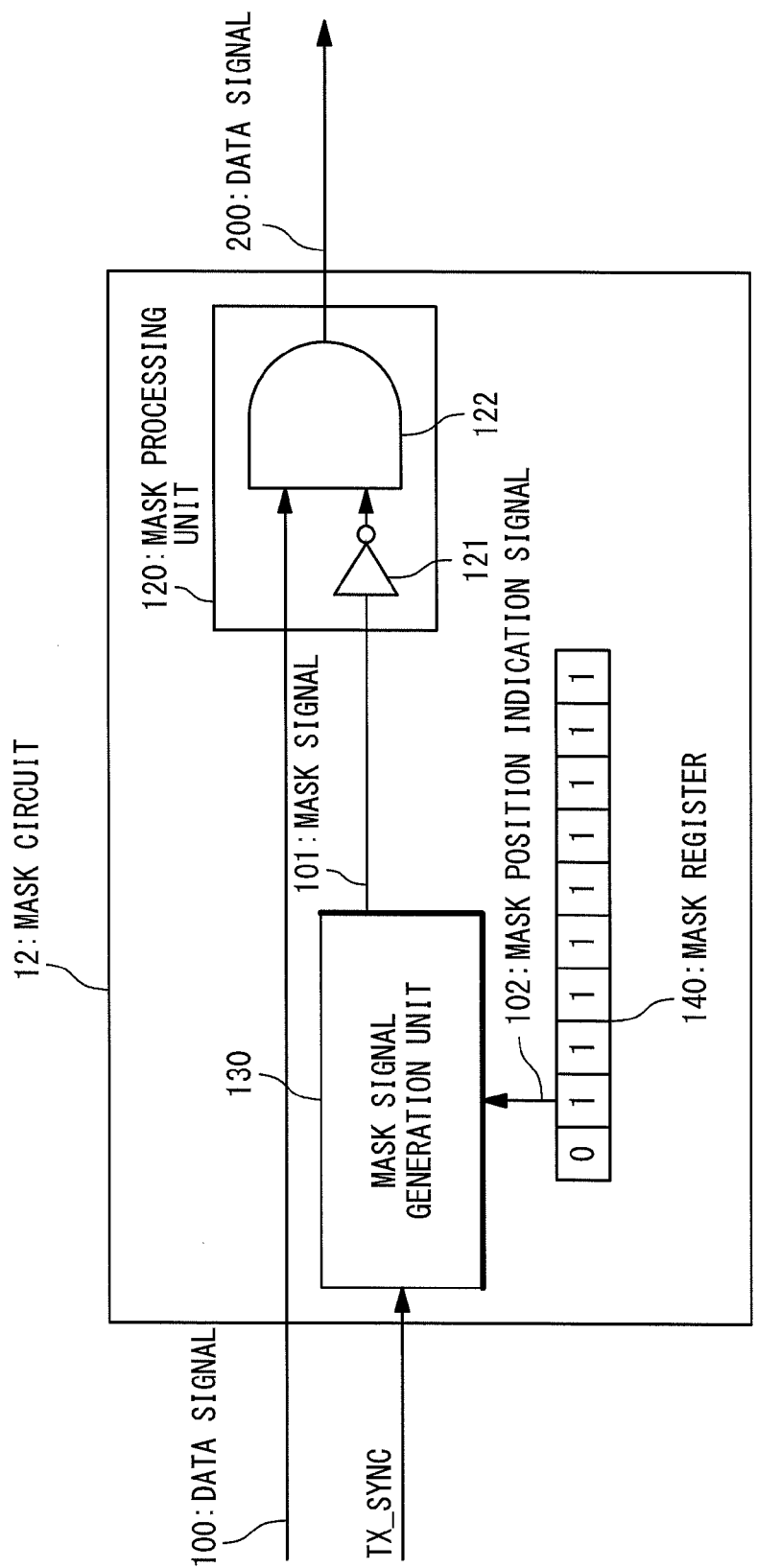
FIG. 4 is a block diagram showing an example of a configuration of a mask circuit according to the embodiment of the present invention.

FIG. 4 is a block diagram showing an example of a configuration of the mask circuit 12. The mask circuit 12 has: a mask processing unit 120 that masks a predetermined segment data depending on a mask signal 101; a mask signal generation unit 130 that outputs the mask signal 101 in synchronization with the synchronization signal TX_SYNC; and a mask register 140 for setting the segment data to be masked.

The mask processing unit 120 controls, depending on a signal level of the mask signal 101, transfer of the data signal 100 (segment data) from the MAC 11 to the buffer 13. More specifically, the mask processing unit 120 preferably has a logic operation circuit that performs logical operation of the data signal 100 and the mask signal 101 and outputs a result of the logical operation as the data signal 200. For example, as shown in FIG. 4, the mask processing unit 120 has: an inverter 121 that inverts the mask signal 101; and an AND circuit 122 that outputs logical product of the data signal 100 and the inverted signal of the mask signal 101, as the data signal 200. When the mask signal 101 is the Low level "0", the mask processing unit 120 lets the data signal 100 through and outputs it as the data signal 200. When the mask signal 101 is the High level "1", the mask processing unit 120 outputs the Low level "0" as the data signal 200. That is, in the case where the mask signal 101 is set to the High level "1", the segment data output from the MAC 11 is masked and thus the data signal 200 of the Low level "0" is output to the buffer 13.

Figure 6:
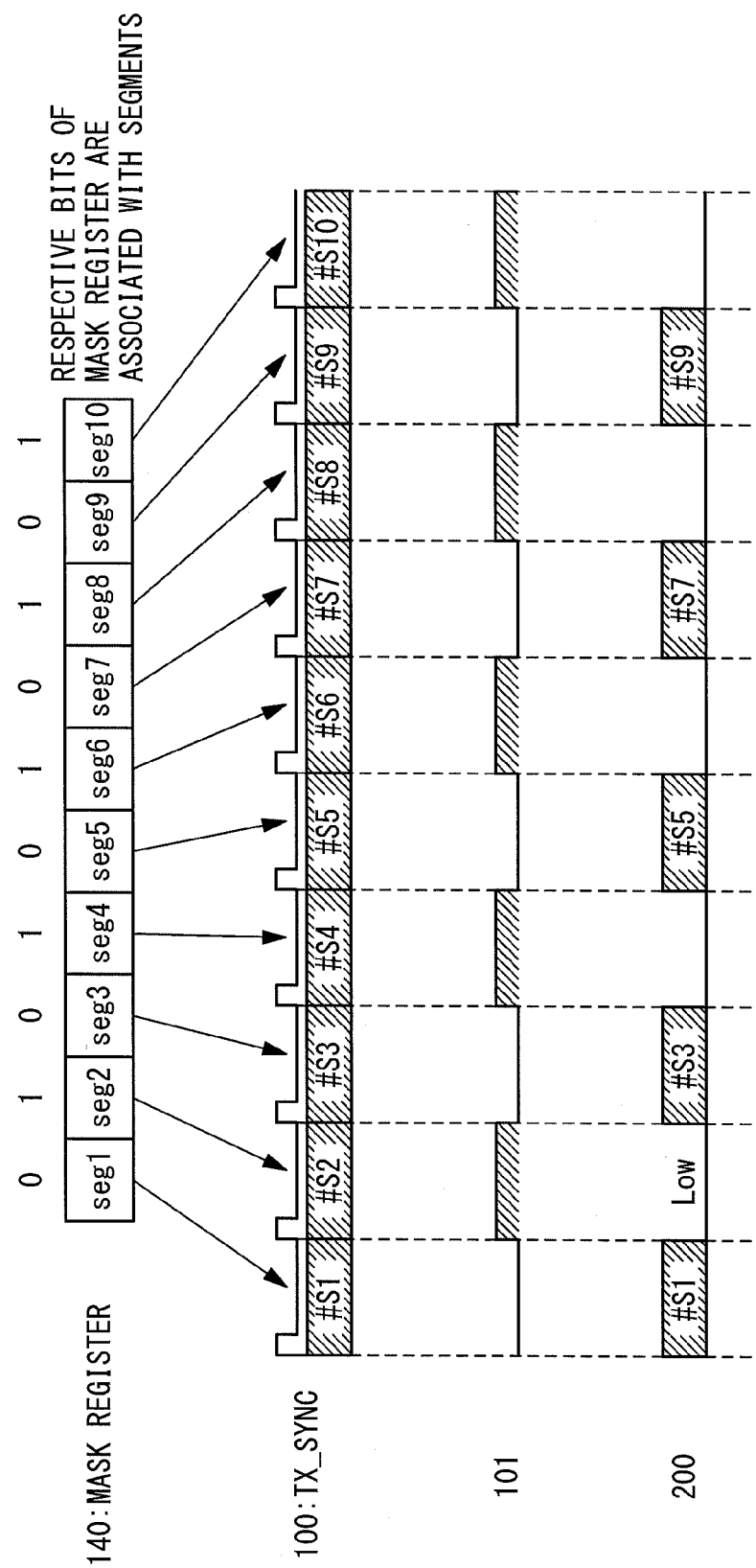
FIG. 6 shows a correspondence relationship between register values set in a mask register and data output to a buffer according to the embodiment of the present invention.

The mask signal generation unit 130 reads a resister value set in the mask register 140 as a mask position indication signal 102, and outputs the mask signal 101 whose signal level corresponds to the logical value of the mask position indication signal 102 to the mask processing unit 120. More specifically, the mask signal generation unit 130 reads register values of the mask register 140 in order from the most significant bit towards the least significant bit in synchronization with the synchronization signal TX_SYNC. The timing of the mask position indication signal 102 is determined by the synchronization signal TX_SYNC that indicates the segment. As shown in FIG. 6, respective bits of the register values set in the mask register 140 are associated with the segment data output from the MAC 11. The mask signal generation unit 130 reads the register values of the mask register 140 in order from the most significant bit. After the register value of the least significant bit is read, the mask signal generation unit 130 changes the read target to the most significant bit and repeats the reading of the register values (mask position indication signal 102). In the case of the 10 Mbps mode, the mask register 140 of 10-bit is preferable, because the segment data is updated every ten segments and the segment data can be masked in a cycle corresponding to the update cycle of the segment data. According to the present example, in the mask register 140, the High level data "1" is set at bit positions corresponding to the mask-target segments and the Low level data "0" is set at the other bit positions.

Referring back to FIG. 3, the data signal 200 after the mask processing is output to the PHY chip 20 through the buffer 13. The PHY chip 20 has buffers 21 and 22 and a synchronization signal generation device 23. The buffer 21 outputs the transmission data TX received from the MAC chip 10 to the network 2 in synchronization with the transmission clock signal TX_CLK supplied from the MAC chip 10. The PHY chip 20 samples the segment data from the transmission data TX in synchronization with the synchronization signal TX_SYNC supplied from the MAC chip 10. The sampling of the segment data is performed every cycle of the synchronization signal TX_SYNC in the case of the 100 Mbps mode, while every ten cycles of the synchronization signal TX_SYNC in the case of the 10 Mbps mode.

The buffer 22 outputs the reception data RX received from the network 2 to the MAC chip 10. The synchronization signal generation device 23 generates, in synchronization with the clock signal CLK (reference clock), the synchronization signal RX_SYNC indicating a boundary between the segments in the data received from the network 2. In the present example, the synchronization signal RX_SYNC having the clock frequency of 12.5 MHz is generated, and ten cycle periods of the clock signal CLK corresponds to one segment. The synchronization signal RX_SYNC is supplied to the MAC 11. The MAC11 extracts the segment data from the reception data RX in synchronization with the synchronization signal RX_SYNC and performs the MAC processing such as error check and filtering.

(Data Transfer Operation)

The interface circuit 1 according to the present embodiment conforms to the SMII and has the two modes, the high-speed mode (100 Mbps) and the low-speed mode (10 Mbps). In the case of the 100 Mbps mode, the MAC 11 updates the segment data every cycle of the synchronization signal TX_SYNC. In this case, the PHY chip 20 samples the segment data and transmits it to the network 2 every cycle of the synchronization signal TX_SYNC. On the other hand, in the case of the 10 Mbps mode, the MAC 11 updates the segment data every ten cycles of the synchronization signal TX_SYNC. During the ten cycle period (unit period), the MAC 11 repeatedly outputs an identical segment data in synchronization with the synchronization signal TX_SYNC. In this case, the PHY chip 20 samples the segment data and transmits it to the network 2 once per ten cycles of the synchronization signal TX_SYNC. It should be noted that the buffers 13, 14, 21 and 22 operate at the same clock frequency (125 MHz) in both the 100 Mbps mode and the 10 Mbps mode.

In this manner, according to the interface circuit 1 of the present embodiment, the MAC 11 updates the segment data in the same cycle as the conventional one both in the high-speed mode and in the low-speed mode. According to the present embodiment, however, the data signal 100 output from the MAC 11 is masked by the mask circuit 12 in the case of the low-speed mode. During a period when the segment data is masked, the buffers 13 and 21 do not perform a toggle operation. Since a voltage of a substrate wiring connecting between the buffers 13 and 21 is fixed at the Low level, the power consumption can be suppressed.

It should be noted that in the 100 Mbps mode, the mask circuit 12 does not function and the data transfer operation is performed as usual. In the case of the 100 Mbps mode, for example, the mask signal 101 output from the mask signal generation unit 130 is always fixed at the Low level "0", regardless of the register values set in the mask register 140. Alternatively, all Low "00_0000_0000" may be set in the mask register 140 in the case of the 100 Mbps mode. In the case of the 10 Mbps mode, the register values of the mask register 140 are set such that the bit position to be masked is the High level "1".

The data transfer operation (from MAC to PHY) in the interface circuit 1 according to the present embodiment will be described with reference to FIGS. 6 and 7. The data transfer operation in the 100 Mbps mode is the same as in the conventional case. Therefore, the data transfer operation in the 10 Mbps mode will be described below. FIG. 6 shows a correspondence relationship between register values set in the mask register 140 and the data signal 200 output to the buffer 13 in the case of the 10 Mbps mode according to the present embodiment.

In FIG. 6, the register values set in the mask register 140 are "01_0101_0101", and the data signal 100 output during the ten cycle period of the synchronization signal TX_SYNC includes the segment data #S1 to #S10. During the period, the signal level of the mask signal 101 output from the mask signal generation unit 130 is repeatedly switched between "0" and "1" in synchronization with the synchronization signal TX_SYNC. During a period when the mask signal 101 of the Low level "0" is output, the data signal 100 passes through. During a period when the mask signal 101 of the High level "1" is output, the data signal 100 is masked. In the present example, the segment data #S2, #S4, #S6, #S8 and #S10 are masked. During the period when the segment data #S2, #S4, #S6, #S8 and #S10 are output from the MAC 11, the data signal 200 of the Low level is input to the buffer 13. Whereas, the segment data #S1, #S3, #S5, #S7 and #S9 pass through and are input as the data signal 200 to the buffer 13.

The buffer 13 outputs the data TX depending on the data signal 200 in synchronization with the transmission clock signal TX_CLK. During the period when the data signal 200 of the Low level is input, the buffer 13 does not perform the toggle operation. Therefore, the power consumption caused by the toggle operation can be cut off during the period when the segment data is masked. Moreover, during this period, the voltage level of the substrate wiring connecting between the buffers 13 and 21 is not inverted and is fixed to the Low level. Therefore, the power consumption due to parasitic resistance and parasitic capacitance of the substrate wiring can be suppressed.

Figure 7:
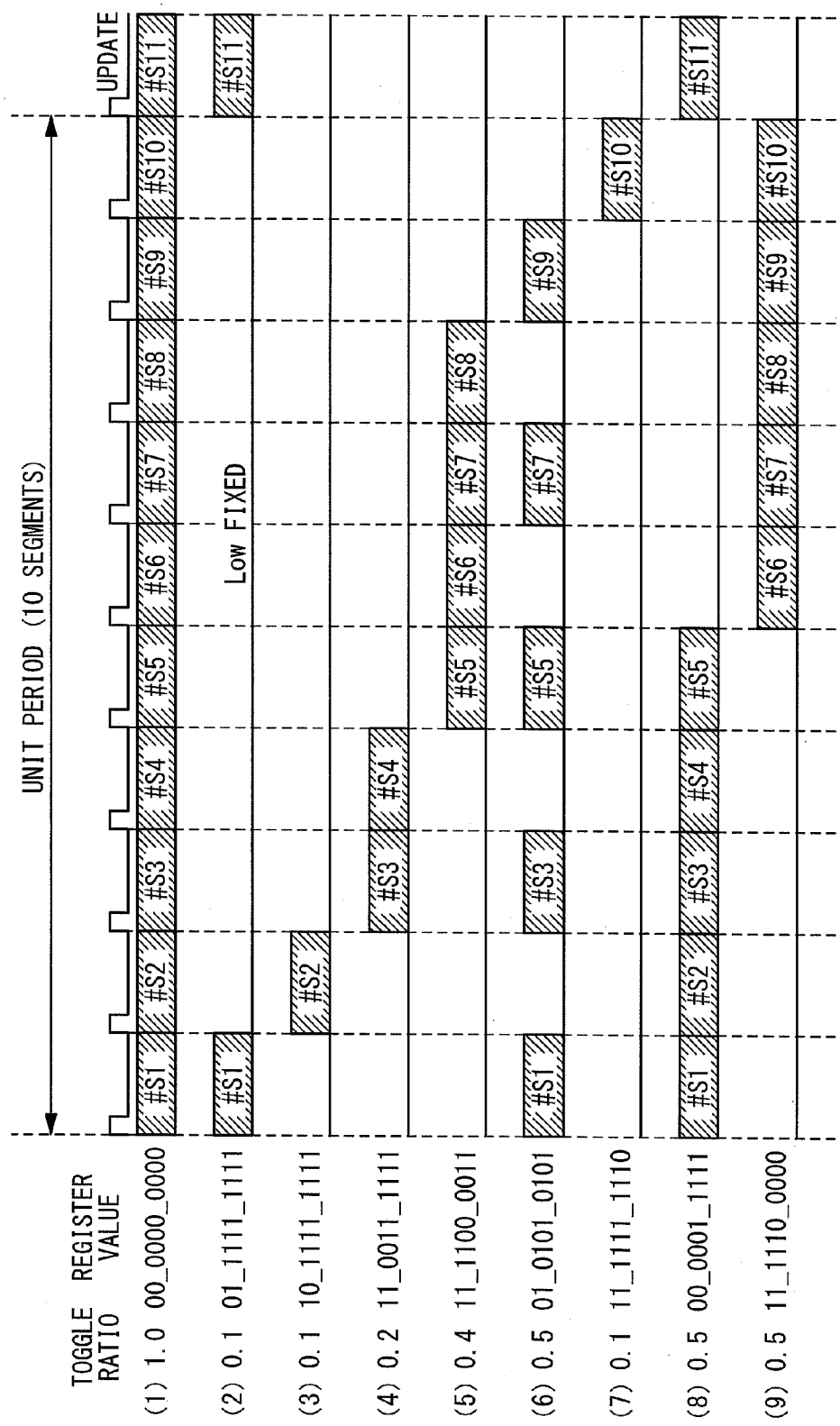
FIG. 7 shows various correspondence relationships between the register values set in the mask register, the segment data to be masked, and a toggle ratio according to the embodiment of the present invention.

FIG. 7 shows various correspondence relationships between the register values set in the mask register 140, the segment data to be masked, and a toggle ratio according to the present embodiment. As shown in FIG. 7, the segment data to be masked (segment position to be masked) and the toggle ratio (power consumption cut ratio) can be arbitrarily changed by changing the register values set in the mask register 140.

The toggle ratio in the case where the register values are set to "00_0000_0000" is 1.0. The toggle ratios in the cases of the other mask patterns (register values) are as follows. As shown in the patterns (2), (3) and (7) in FIG. 7, when the register value "0" is set at only one bit, the data signal 200 is fixed at the Low level in nine segment periods out of the total ten segment periods. In this case, the toggle ratio is 0.1, and thus the power consumption can be greatly reduced. Similarly, in the case where the register value "0" is set at two bits, the toggle ratio is 0.2 (see the pattern (4) in FIG. 7). In the case where the register value "0" is set at four bits, the toggle ratio is 0.4 (see the pattern (5) in FIG. 7). In this manner, it is possible to arbitrarily change the toggle ratio, namely the power consumption by changing the register values set in the mask register 140. Moreover, the segment position to be masked can be arbitrarily set by the register values.

If the register values are set to "00_0000_0000" (all Low), the segment data is input to the buffer 13 without being masked (see the pattern (1) in FIG. 7). In the case of the 100 Mbps mode (high-speed mode), there is no need to mask the segment data, and it is thus desirable to set the register values as shown in the pattern (1) in FIG. 7.

(Identifying Sampling Timing of Segment Data)

In the 10 Mbps mode, the PHY chip 20 samples the segment data at a predetermined timing. According to the conventional technique, there is no need to recognize the sampling timing in the PHY chip 20, because the identical segment data is repeatedly output during the ten segment period. According to the present embodiment, on the other hand, if the PHY chip 20 carries out the sampling in a period when the segment data is masked, normal data transmission cannot be achieved. In order to avoid such the problem, it is necessary to identify the sampling timing in the PHY chip 20 prior to the data transmission and to set the mask segment period to other than the identified timing.

Figure 8:
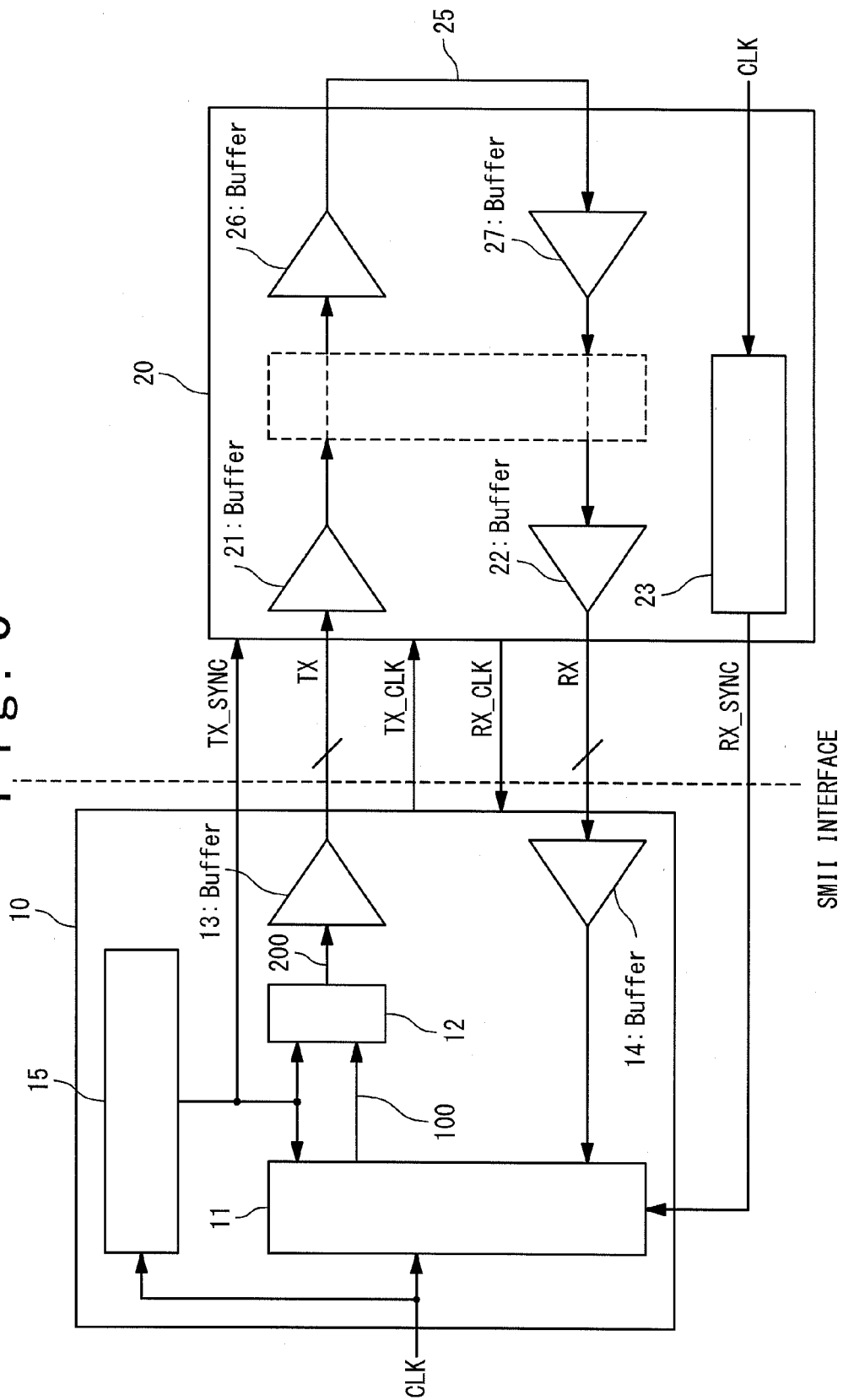
FIG. 8 is a block diagram showing an example of a configuration of the interface at a time of identifying a sampling timing.

An operation of identifying the sampling timing in the PHY chip 20 will be described with reference to FIGS. 8 and 9. FIG. 8 is a block diagram showing an example of a configuration of the interface at a time of identifying the sampling timing.

According to the interface circuit 1 of the present embodiment, the operation of identifying the sampling timing in the PHY chip 20 is performed prior to the data transmission from the MAC chip 10 to the PHY chip 20. As shown in FIG. 8, an output of the buffer 21 and an input of the buffer 22 in the PHY chip 20 are loop-back connected through a buffer 26, an interconnection 25 and a buffer 27. As a result, the data output to the network 2 through the PHY chip 20 is loop-backed to the MAC chip 10. More specifically, a functional block samples the segment data from the output of the buffer 21, and the buffer 26 outputs the output of the functional block to the interconnection 25. The buffer 27 outputs a signal received from the interconnection 25 to the buffer 22 through a functional block. The MAC chip 10 receives the loop-backed data as the reception data RX and determines whether or not the loop-backed data is the same as the transmitted segment data. It should be noted that the determination processing may be performed by the MAC 11 or may be performed by an upper layer device (not shown).

If the segment data is not detected within the unit period (the ten cycle period of the synchronization signal TX_SYNC), the MAC 11 can determine that the mask timing is coincident with the sampling timing. In this case, the MAC 11 changes the mask position in the data transmitted to the PHY chip 20. By repeating the determination of whether or not the loop-backed data is the same as the transmitted segment data and the change in the mask position in the data transmitted to the PHY chip 20, it is possible to identify the sampling timing in the PHY chip 20.

Figure 9:
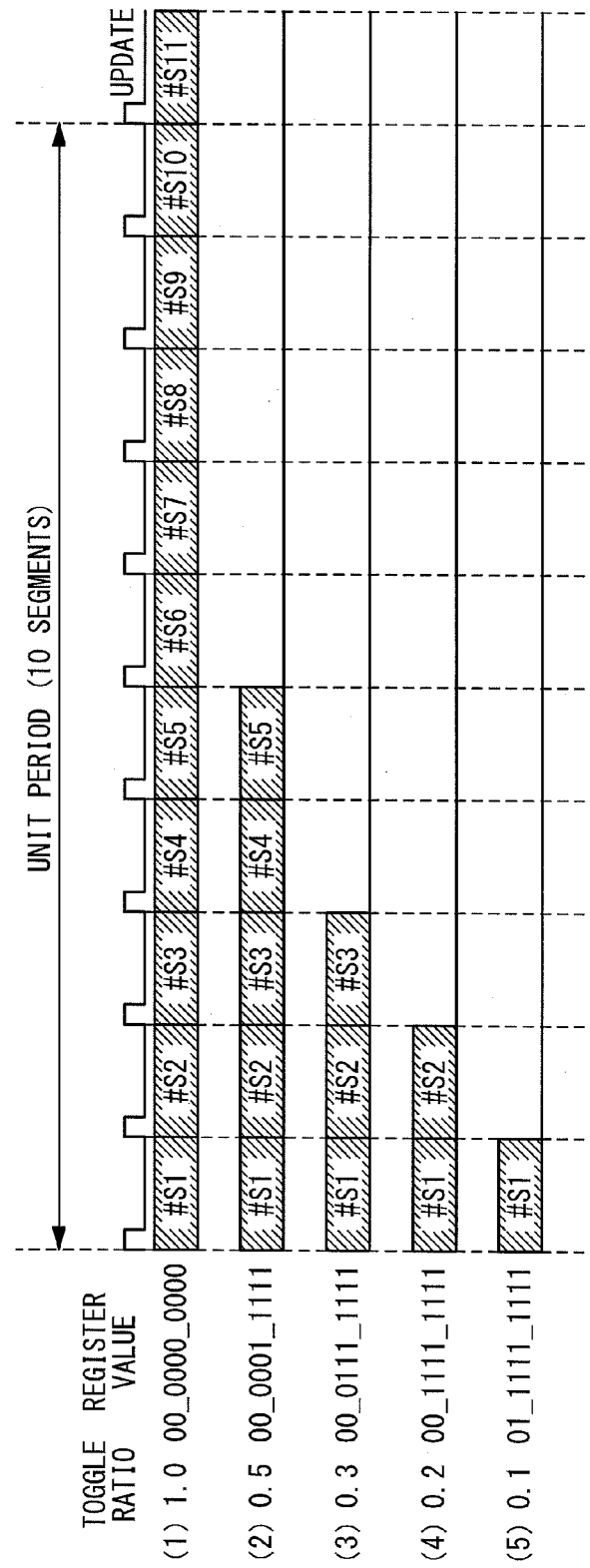
FIG. 9 shows an example of an operation of identifying the sampling timing.

FIG. 9 shows an example of the operation of identifying the sampling timing. In the present example, a binary search method is applied to the operation of identifying the sampling timing. A cycle in which the segment data is updated is the unit period (here, ten segment period). In the binary search method, setting of the register values in the mask register 140 and data transmission from the MAC chip 10 to the PHY chip 20 are repeated with respect to each unit period. By changing the register values to increase or change the mask segment period, a mask pattern with which the correct sampling in the PHY chip 20 becomes impossible can be identified. In other words, it is possible to identify the sampling timing in the PHY chip 20. A concrete example of the binary search method will be described with reference to FIG. 9.

First, as shown in the pattern (1) in FIG. 9, the register values "00_0000_0000" (all Low) are set in the mask register 140, and then data is output from the MAC chip 10 to the PHY chip 20 for the unit period (ten segment period). In this case, the segment data is output from the MAC chip 10 to the PHY chip 20 without being masked. Therefore, the transmitted segment data is detected from the data that are loop-backed to the MAC chip 10. Consequently, it is confirmed that the segment data is correctly sampled in the PHY chip 20.

Next, as shown in the pattern (2) in FIG. 9, the register values "0_0001_1111" are set in the mask register 140 such that the latter half of the unit period is masked, and then data is output from the MAC chip 10 to the PHY chip 20 for the unit period. In this case, the segment data #S6 to #S10 are masked. In a case where the segment data is included in the loop-backed data from the PHY chip 20, it is considered that the sampling timing exists in the first half (segment data #S1 to #S5) of the unit period that is not masked. In this case, next register values are so set as to mask the further half of the currently unmasked period (if dividing equally is impossible, it is set to "half of the currently unmasked period—one segment period). On the other hand, in a case where the segment data is not included in the loop-backed data from the PHY chip 20, it is considered that the sampling timing exists in the latter half (segment data #S6 to #S10) of the unit period. In this case, next register values are so set as to mask the further half of the currently masked period (if dividing equally is impossible, it is set to "half of the currently masked period—one segment period). In the example shown in FIG. 9, the segment data is detected from the loop-backed data from the PHY chip 20, and thus "00_0111_1111" as the next register values are set in the mask register 140.

Next, as shown in the pattern (3) in FIG. 9, the register values "00_0111_1111" are set in the mask register 140, and then data is output from the MAC chip 10 to the PHY chip 20 for the unit period. In this case, the segment data #S4 to #S10 are masked. In a case where the segment data is included in the loop-backed data from the PHY chip 20, it is considered that the sampling timing exists in the unmasked period (segment data #S1 to #S3) of the unit period. In this case, next register values are so set as to mask the further half of the currently unmasked period (if dividing equally is impossible, it is set to "half of the currently unmasked period—one segment period). On the other hand, in a case where the segment data is not included in the loop-backed data from the PHY chip 20, it is considered that the sampling timing exists in the currently added masked period (segment data #S4 to #S5). In this case, next register values are so set as to mask the further half of the period (if dividing equally is impossible, it is set to "half of the period—one segment period). In the example shown in FIG. 9, the segment data is detected from the loop-backed data from the PHY chip 20, and thus "00_1111_1111" as the next register values are set in the mask register 140.

Next, as shown in the pattern (4) in FIG. 9, the register values "00_1111_1111" are set in the mask register 140, and then data is output from the MAC chip 10 to the PHY chip 20 for the unit period. In this case, the segment data #S3 to #S10 are masked. In a case where the segment data is included in the loop-backed data from the PHY chip 20, it is considered that the sampling timing exists in the unmasked period (segment data #S1 to #S2) of the unit period. On the other hand, in a case where the segment data is not included in the loop-backed data from the PHY chip 20, it is considered that the sampling timing exists in the currently added masked period (segment data #S3). In the example shown in FIG. 9, the segment data is detected from the loop-backed data from the PHY chip 20, and thus "01_1111_1111" as the next register values are set in the mask register 140.

Next, as shown in the pattern (5) in FIG. 9, the register values "01_1111_1111" are set in the mask register 140, and then data is output from the MAC chip 10 to the PHY chip 20 for the unit period. In this case, the segment data #S2 to #S10 are masked. In a case where the segment data is included in the loop-backed data from the PHY chip 20, it is considered that the sampling timing exists in the unmasked period (segment data #S1) of the unit period. On the other hand, in a case where the segment data is not included in the loop-backed data from the PHY chip 20, it is considered that the sampling timing exists in the currently added masked period (segment data #S2). In the example shown in FIG. 9, the segment data is not detected from the loop-backed data from the PHY chip 20. Consequently, the sampling timing in the PHY chip 20 is identified to be the segment #S2.

In this manner, the sampling timing in the PHY chip 20 can be identified by the sampling timing identification processing according to the present embodiment. The segment that, even if masked, does not affect the data communication can be identified. If the sampling timing is unknown, the interface circuit 1 according to the present embodiment identifies the sampling timing by the above-described method and sets the segment to be masked. The mask pattern (register values) depending on the identified sampling timing may be generated by a program that is executed by a computer or may be set by a user by using an input device (not shown).

A means for setting the mask pattern of the segment data is not limited to the mask register 140. For example, as shown in FIG. 10, a DIP (Dual In-line Package) switch 40 may be used for setting the mask pattern. More specifically, a mask position indication signal 103 is set by ON/OFF of the DIP switch 40 that is externally provided. Depending on the mask position indication signal 103, the mask circuit 12 executes the mask processing with respect to the data signal 100. The DIP switch 40 has 10-bit switches corresponding to the update cycle of the segment data, and outputs the bit data depending on ON/OFF of the respective switches as the 10-bit mask position indication signal 103 to the mask signal generation unit 130. The mask signal generation unit 130 selects the 10-bit data of the mask position indication signal 103 one by one and outputs the selected bit as the mask signal 101 to the mask processing unit 120. For example, the mask signal generation unit 130 has switches that selectively connect signal lines to which the mask position indication signal 103 is input and signal lines from which the mask signal 101 is output. In this case, the switching of the signal lines is performed in synchronization with the synchronization signal TX_SYNC. Consequently, the mask signal 101 is switched to the signal level depending on the pattern set by the DIP switch 40, in synchronization with the synchronization signal TX_SYNC.

According to the present embodiment, as described above, it is possible in the interface circuit 1 that conforms to the SMII specification to reduce unnecessary signal transitions and thus the power consumption due to the unnecessary toggle operation during the 10 Mbps mode, with utilizing the existing PHY and MAC. Moreover, by the sampling timing identification processing, it is possible to identify the sampling timing in the data reception part of the PHY. As a result, it is possible to set the segment period to be masked without causing data transmission error.

It is also possible to perform the identification of the sampling timing in a simplified way with reducing the power consumption related to the data transmission. For example, the register values (mask pattern) are first set as shown in the pattern (6), (8) or (9) in FIG. 7, wherein the toggle ratio is 0.5. Then, the data transmission and the above-described sampling timing identification processing are carried out. If a data transmission error occurs or the segment data is not included in the loop-backed data, the masked segment data and the unmasked segment data are exchanged. After that, the data transmission is started. As a result, the toggle ratio becomes half. In other words, it is possible to reduce the power consumption without carrying out detailed identification of the sampling timing.

It is apparent that the present invention is not limited to the above embodiments and may be modified and changed without departing from the scope and spirit of the invention.

For example, in the above-described embodiment, the data transmission speeds in the high-speed mode and the low-speed mode are set to 100 Mbps and 10 Mbps, respectively. However, the data transmission speed is not limited to that and can be set further higher. Moreover, the frequency of the reference clock, with which the data transmission is carried out in the high-speed mode and the low-speed mode, is not limited to 125 MHz. Furthermore, the numbers of bytes of the synchronization signals TX_SYNC and RX_SYNC and the segment and the number of segments are not limited to the above-described examples.

In the above-described embodiment, the update cycle of the segment data output from the MAC 11 is the ten segment period (ten cycles of the synchronization signal TX_SYNC). However, the update cycle is not limited to that. It goes without saying that the number of bits of the mask register 140 or the DIP switch 40 also can be varied depending on the update cycle.

Moreover, the number of bits of the mask register 140 or the DIP switch 40 just needs to fit the update cycle of the segment data. For example, a 5-bit register is used as the mask register 140, and the mask signal generation unit 130 repeats the read operation (read data of the mask register 140 in order from the most significant bit to the least significant bit) for two times within the unit period (ten segment period). Also in this case, it is possible to perform the mask processing in accordance with the update cycle of the segment data.

What is claimed is:

1. A serial communication device comprising:
   a media access control (MAC) that conforms to a Serial Media Independent Interface (SMII) specification and outputs a plurality of identical segment data for a unit period comprising a plurality of segments;
   a mask circuit configured to mask a predetermined segment data out of the plurality of identical segment data received from the MAC and to output the other segment data of the plurality of identical segment data; and
   a buffer configured to receive the segment data output from said mask circuit and to output the received segment data to a physical layer device in synchronization in response to a clock signal,
   wherein said mask circuit comprises an operational circuit configured to control, depending on a signal level of a mask signal, transfer of the segment data from said MAC circuit to said buffer.

2. The serial communication device according to claim 1,
   wherein in a high-speed mode, said physical layer device samples the segment data in synchronization with a synchronization signal,
   wherein in a low-speed mode, said physical layer device samples the segment data every plural cycles of said synchronization signal, and
   wherein said MAC updates content of the segment data every plural cycles of said synchronization signal.

3. A serial communication method comprising:

outputting, by a media access control (MAC) that conforms to a Serial Media Independent Interface (SMII) specification, a plurality of identical segment data for a unit period comprising a plurality of segments;

masking a predetermined segment data out of the plurality of identical segment data received from the MAC while outputting the other segment data of the plurality of identical segment data;

outputting said other segment data to a physical layer device in synchronization with a clock signal, and identifying the sampling timing in said physical layer device, wherein said masking comprises masking said predetermined segment data that is the segment data other than ones corresponding to said identified sampling timing.

4. The serial communication method according to claim 3, wherein in a high-speed mode, said physical layer device samples the segment data in synchronization with a synchronization signal, wherein in a low-speed mode, said physical layer device samples the segment data every plural cycles of said synchronization signal, and wherein said MAC updates content of the segment data every plural cycles of said synchronization signal.

* * * * *

UNITED STATES PATENT AND TRADEMARK OFFICE
CERTIFICATE OF CORRECTION

Page 1 of 1

PATENT NO. : 8,429,317 B2
APPLICATION NO. : 13/451311
DATED : April 23, 2013
INVENTOR(S) : Tomofumi Iima It is certified that error appears in the above-identified patent and that said Letters Patent is hereby corrected as shown below:

In the Specification:

Column 1, Line 45: delete "se mi" and insert -- semi --

Column 10, Line 11: delete ""0_0001_1111"" and insert -- "00_0001_1111" --

In the Claims:

Column 12, Line 53: In Claim 1, after "device" delete "in synchronization".

Signed and Sealed this
Second Day of September, 2014

Michelle K. Lee
*Deputy Director of the United States Patent and Trademark Office*